UNITED STATES PATENT OFFICE 2,312,689

REACTION PRODUCT OF ALDEHYDES AND DIAZINE DERIVATIVES

Gaetano F. D'Alelio and James W. Underwood, Pittsfield, Mass., assignors to General Electric Company, a corporation of New York No Drawing. Application July 30, 1941,
Serial No. 404,662

19 Claims. (Cl. 260—72)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a diazine derivative corresponding to the following general formula:

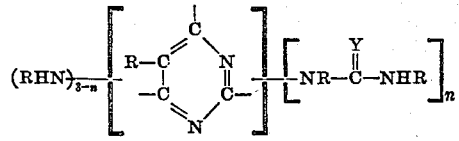

In the above formula $n$ represents an integer and is at least 1 and not more than 3, Y represents a member of the class consisting of oxygen and sulfur, and R represents a member of the class consisting of hydrogen and monovalent hydrocarbon and halo-hydrocarbon radicals, numerous examples of which hereafter are given. From a consideration of the formula it will be seen that when $n$ is 3 there will be no amino (—NHR) groups attached to the diazine nucleus. Instead of the ureido or thioureido 1,3 (or meta) diazines (ureido or thioureido pyrimidines) represented by the above formula, the corresponding 1,2- or ortho-diazines (pyridazines) or the 1,4- or paradiazines (pyrazines) may be used.

Illustrative examples of monovalent radicals that R in the above formula may represent are aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlorphenyl, chlorcyclohexyl, chlormethyl, dichlorphenyl, ethyl chlorphenyl, phenyl chlorethyl, bromethyl, brompropyl, bromtolyl, chlortolyl, etc. Preferably R is hydrogen.

More specific examples of ureido and thioureido diazines that may be employed in producing our new condensation products are the triureido 1,3-diazines, the tri-(thioureido) 1,3-diazines, the monoamino (—NHR) diureido 1,3-diazines, the monoamino (—NHR) di-(thioureido) 1,3-diazines, the diamino [(—NHR)₂] monoureido 1,3-diazines and the diamino [(—NHR)₂] mono-(thioureido) 1,3-diazines.

The ureido and thioureido diazines that are used in carrying the present invention into effect are more fully described and are specifically claimed in our copending application Serial No. 404,663, filed concurrently herewith and assigned to the same assignee as the present invention.

Other and more specific examples of ureido and thioureido diazines that may be used in producing our new condensation products are listed below:

2-ureido 4,6-diamino 1,3-diazine
2-ureido 4,6-di-(ethylamino) 1,3-diazine
2-(ethyl ureido) 4,6-diamino 1,3-diazine
2-ureido 4-methylamino 6-amino 1,3-diazine
2-ureido 4-propylamino 6-phenylamino 1,3-diazine
2-(N,N'-diethyl ureido) 4,6-diamino 1,3-diazine
2-(N-phenyl N'-methyl ureido) 4,6-di-(ethylamino) 1,3-diazine
2-(beta-chlorethyl ureido) 4,6-diamino 1,3-diazine
2-thioureido 4,6-diamino 1,3-diazine
2,4-diureido 6-amino 1,3-diazine
2,4,6-triureido 1,3-diazine
2-ureido 5-ethyl 4,6-diamino 1,3-diazine
2-ureido 5-phenyl 4,6-di-(ethylamino) 1,3-diazine
2,4-diureido 5-methyl 6-amino 1,3-diazine
2,4,6-triureido 5-chlorethyl 1,3-diazine
2-(ethyl thioureido) 4,6-di-(phenylamino) 1,3-diazine
2-thioureido 4,6-di-(ethylamino) 1,3-diazine
2-(N-ethyl N'-phenyl thioureido) 4,6-diamino 1,3-diazine
2-(N,N'-diethyl thioureido) 4,6-diamino 1,3-diazine
2-thioureido 4-ethylamino 6-phenylamino 1,3-diazine
2-ureido 4,6-di-(methylamino) 1,3-diazine
2-ureido 4,6-di-(cyclohexylamino) 1,3-diazine
2-ureido 4,6-di-(chlorphenylamino) 1,3-diazine
2-ureido 4,6-di-(chlorethylamino) 1,3-diazine
2-ureido 5-methyl 4,6-di-(ethylamino) 1,3-diazine
2,4-di-(thioureido) 6-amino 1,3-diazine
2,4,6-tri-(thioureido) 1,3-diazine
2-ureido 4-thioureido 6-amino 1,3-diazine
2-thioureido 5-ethyl 4,6-di-(ethylamino) 1,3-diazine
2,4-di-(thioureido) 5-methyl 6-amino 1,3-diazine
2,4,6-tri-(thioureido) 5-chlorethyl 1,3-diazine The formulas for most of the above compounds are shown in our above-identified copending application Serial No. 404,663.

The present invention is based on our discovery that new and valuable materials of particular utility in the plastics and coating arts can be produced by effecting reaction between ingredients comprising essentially an aldehyde, including polymeric aldehydes and aldehyde-addition products, and diazines (more particularly the 1,3-diazines) containing at least one ureido (—NRCONHR) or thioureido (—NRCSNHR) substituent group attached directly to a carbon atom of the diazine nucleus.

Resins heretofore have been made by condensing an aldehyde with an aminodiazine, e. g., 2,4,6-triamino 1,3-diazine. Such resins have excellent heat and water resistance, but are deficient in other properties that are desirable in a resin to be used in the production of molding compounds and molded articles. The urea-aldehyde resins, on the other hand, have much better flow characteristics than the aminodiazine-aldehyde resins but are less resistant to water. The resinous condensation products of the present invention have the high water resistance of the known aminodiazine-aldehyde resins plus the improved flow characteristics of the urea-aldehyde resins. Another property which is characteristic of our new resinous compositions is that they readily convert to an insoluble, infusible state at a higher pH than do the ordinary urea-aldehyde resins. As a result, the heat-convertible resins of this invention have better time- or storage-stability characteristics than the heat-convertible urea-aldehyde resins. The heat resistance of our new resins also is much better than that of the urea-aldehyde resins.

Thus it is seen that the present invention provides a resinous composition which has combined therein the desirable properties of the conventional aminodiazine-aldehyde and urea-aldehyde resins without sacrifice of other useful properties. This is a surprising and unexpected result that in no way could have been predicted. Because of the unique properties of the resins of this invention, they are suitable for molding and other applications for which the ordinary aminodiazine-aldehyde and urea-aldehyde resins are unsuited.

In carrying our invention into effect the initial condensation reaction may be effected at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. Good results are obtained my causing the condensation reaction between the primary components to take place in the presence of a primary condensation catalyst and a secondary condensation catalyst. Condensation products of excellent time- or storage-stability characteristics are obtained by using as the primary catalyst a member of the class consisting of (1) nitrogen-containing basic tertiary compounds that are aldehyde-non-reactable, e. g., tertiary amines such as trialkyl (e. g., trimethyl, triethyl, etc.) amines, triaryl (e. g., triphenyl, tricresyl, etc.) amines, etc., and (2) nitrogen-containing basic compounds that are aldehyde-reactable, for instance, ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, should be a fixed alkali, for instance, a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the ureido or thioureido diazine, or mixture of ureido diazine and thioureido diazine, may be carried out in the presence of solvents or diluents, fillers, other natural or synthetic resinous bodies, or while admixed with other materials that also can react with the aldehydic reactant or with the diazine derivative, e. g., ketones, urea, thiourea, selenourea, iminourea (guanidine), substituted ureas, thioureas, selenoureas and iminoureas, numerous examples of which are given in various copending applications of one of us (Gaetano F. D'Alelio), for instance in D'Alelio copending application Serial No. 363,037, filed October 26, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aminotriazines, e. g., melamine, ammeline, ammelide, numerous other examples being given in various D'Alelio copending applications, for instance in D'Alelio copending application Serial No. 377,524, filed February 5, 1941, and in applications referred to in said copending application; ureido and thioureido triazines, specifically the ureido and thioureido 1,3,5-triazines, numerous examples of which are given in D'Alelio copending application Serial No. 404,661, filed July 30, 1941; phenol and substituted phenols, e. g., the cresols, the xylenols, the tertiary alkyl phenols and other phenols such as mentioned in D'Alelio Patent 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the diazine derivative and the aldehyde by mixing all the reactants and effecting condensation therebetween or by various permutations of reactants as described, for example, in D'Alelio copending application Serial No. 363,037, filed Oct. 26, 1940, with particular reference to reactions involving a urea, an aldehyde and a semi-amide of oxalic acid. For instance, we may form a partial condensation product of ingredients comprising urea or melamine, a ureido or thioureido diazine of the kind herein described, e. g., 2,4,6-triureido 1,3-diazine, 2-ureido 4,6-diamino 1,3-diazine, etc., and an aldehyde, including polymeric aldehydes and aldehyde-addition products, e. g., formaldehyde, paraformaldehyde, dimethylol urea, etc., and thereafter effect reaction between this partial condensation product and, for example, a curing reactant, specifically a chlorinated acetamide, to obtain a heat-curable composition.

Some of the condensation products of this invention are thermoplastic materials even at an advanced stage of condensation while others are thermosetting or potentially thermosetting bodies that convert under heat or under heat and pressure to an insoluble, infusible state. The thermoplastic condensation products are of particular utility as plasticizers for other synthetic resins. The thermosetting or potentially thermosetting condensation products, alone or mixed with fillers, pigments, dyes, lubricants, plasticizers, etc., may be used, for example, in the production of molding compositions.

The heat-curable resinous condensation products of this invention show excellent flow characteristics during a short curing cycle. This is a property that is particularly desirable in a molding compound. The molded resins are exceptionally light in color. Products of any desired colors can be produced by incorporating a suitable pigment into the molding compound. The molded articles have good surface finish and excellent resistance to water and arcing. They have a high dielectric strength. The pH at which the heat-curable resins of this invention cure generally is of the order of 5.0 to 8.0 or higher. Basic fillers such as asbestos, therefore, can be used satisfactorily in the production of molding compounds without detrimental effect upon the rapidity of cure of the compound.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance, as surface coating materials, in the production of paints, varnishes, lacquers, enamels, etc., for general adhesive applications, in producing laminated articles and for numerous other purposes. The liquid, heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how our invention may be carried into effect, the following examples are given by way of illustration. All parts are by weight.

Example 1

| | Parts |
|---|---|
| 2,4,6-triureido 1,3-diazine | 100.0 |
| Aqueous formaldehyde (approx. 37.1% HCHO) | 97.2 |
| Aqueous ammonia (approx. 28% NH$_3$) | 10.0 |
| Sodium hydroxide in 10 parts water | 0.2 | were heated together under reflux at the boiling temperature of the mass for 30 minutes, yielding a clear, colorless syrup. When a sample of this syrup was heated on a 140° C. hot plate it bodied to a thermoplastic resin that was potentially heat-curable. One (1.0) part of chloracetamide (monochloracetamide) was added to the above syrupy partial condensation product of ingredients comprising formaldehyde and 2,4,6-triureido 1,3-diazine. The resulting mixture was refluxed for an additional 5 minutes at boiling temperature to cause the chloracetamide to intercondense with the said partial condensation product. A molding compound was made from the thermosetting resinous mass thereby obtained by mixing it with 70 parts alpha cellulose in flock form and 0.4 part of a mold lubricant, specifically zinc stearate. The wet compound was dried at 64° C. for 1½ hours. A sample of the dried compound was molded at 130° C. for 5 minutes under a pressure of 2,000 pounds per square inch, yielding a well-cured molded article. The molding compound showed good flow characteristics during molding. The molded piece had excellent water resistance as shown by the fact that, when immersed in boiling water for 15 minutes and then in cold water for 5 minutes, it absorbed only 1.1% by weight of water.

Instead of using chloracetamide as above described to obtain a heat-curable resinous composition of accelerated curing characteristics, thermosetting compositions may be produced by adding to the syrup direct or active curing catalysts (e. g., phthalic anhydride, citric acid, etc.), or latent curing catalysts (e. g., sodium chloracetate, N-diethyl chloracetamide, glycine ethyl ester hydrochloride, etc.) or by intercondensation with other curing reactants (e. g., di- and tri-chloracetamides, chloracetonitriles, alpha, beta-dibrompropionitrile, aminoacetamide hydrochloride, aminoacetonitrile hydrochloride, ethylene diamine monohydrochloride, diethanol amine hydrochloride, nitrourea, glycine, sulfamic acid, chloracetyl urea, chloracetone, citric diamide, phenacyl chloride, chloral urea, polysalicylide, etc.). Other examples of active and latent curing catalysts and of curing reactants that may be employed to accelerate or to effect the curing of the thermosetting or potentially thermosetting resins of this and other examples are given in various D'Alelio copending applications, for instance in copending application Serial No. 346,962, filed July 23, 1940, and Serial No. 354,395, filed August 27, 1940, both of which applications are assigned to the same assignee as the present invention.

Example 2

| | Parts |
|---|---|
| 2,4,6-triureido 1,3-diazine | 41.6 |
| Urea | 38.4 |
| Aqueous formaldehyde (approx. 37.1% HCHO) | 129.6 |
| Aqueous ammonia (approx. 28% NH$_3$) | 8.0 |
| Sodium hydroxide in 10 parts water | 0.2 | were heated together under reflux for 30 minutes at boiling temperature to yield a syrup that bodied to a transparent, thermoplastic resinous mass when a sample of it was heated on a 140°–150° C. hot plate. This syrup cured rapidly to an insoluble, infusible state when treated with various curing agents such as described under Example 1, followed by heating at temperatures of the order of 140° to 150° C.

To 230 parts of the syrup produced as above set forth was added 1 part chloracetamide and the mixture was heated under reflux at boiling temperature for 10 minutes to effect intercondensation between the chloracetamide and the partial condensation product of urea, 2,4,6-triureido 1,3-diazine and formaldehyde. A molding compound was made from the resulting syrup by mixing it with 70 parts alpha cellulose and 0.4 part zinc stearate. The wet compound was dried for 2 hours at 60° C. A sample of the dried compound was molded at 130° C. for 5 minutes under a pressure of 2,000 pounds per square inch. The compound exhibited very commendable plastic flow during molding. The molded article was well cured and well knitted together. It had an excellent surface finish. It absorbed 2.5% by weight of water when tested for water absorption as described under Example 1.

Example 3

|  | Parts |
|---|---|
| 2,4,6-triureido 1,3-diazine | 51.2 |
| Para-amino benzene sulfonamide | 34.2 |
| Aqueous formaldehyde (approx. 37.1% HCHO) | 97.2 |
| Aqueous ammonia (approx. 28% NH₃) | 6.0 |
| Sodium hydroxide in 10 parts water | 0.2 | were heated together under reflux at boiling temperature for 15 minutes. A considerable amount of resin precipitated from the liquid mass. Upon cooling slightly, this resin hardened. The solid resin melted when heated on a 140° C. hot plate. The addition of various curing catalysts and curing reactants such as described under Example 1, specifically citric acid, sulfamic acid, chloracetamide and glycine, to samples of the thermoplastic resin resulted in resins that cured readily to an insoluble, infusible state at 140° C.

The gelled resin was dried at 60° C. for 30 minutes and then at room temperature for 3 hours. The dehydrated resin was molded at 130° C. for 5 minutes under a pressure of 2,000 pounds per square inch, yielding a molded piece that was very resistant to water and alcohols.

Example 4

|  | Parts |
|---|---|
| 2,4,6-triureido 1,3-diazine | 25.6 |
| Dimethylol urea (containing approx. 11% by weight water) | 72.0 |
| Aqueous ammonia (approx. 28% NH₃) | 6.0 |
| Sodium hydroxide in 5 parts water | 0.1 |
| Water | 100.0 |
| Chloracetamide | 1.0 |

All of the above components with the exception of the chloracetamide were heated together under reflux for 30 minutes, after which the stated amount of chloracetamide was added and refluxing was continued for an additional 5 minutes. The resulting syrupy condensation product was mixed with 70 parts alpha cellulose and 0.4 part zinc stearate to form a molding compound. The wet compound was dried for 1 hour at 60° C. A sample of the dried compound was molded at 130° C. for 5 minutes under a pressure of 2,000 pounds per square inch. The molded piece was well cured and exhibited excellent flow characteristics during molding. It absorbed 2.3% by weight of water when tested for water-absorption characteristics as described under Example 1.

Example 5

|  | Parts |
|---|---|
| 2,4,6-triureido 1,3-diazine | 51.2 |
| Acrolein | 33.6 |
| Sodium hydroxide in 5 parts water | 0.1 |
| Water | 100.0 | were heated together under reflux at boiling temperature for 15 minutes. When the resulting syrup was dehydrated by heating it on a 140° C. hot plate, it bodied to an infusible resin, even in the absence of active or latent curing catalysts or curing reactants such as described under Example 1. However, the addition of such curing agents accelerated the curing of the resin to an infusible, insoluble state. The cured resin was not attacked by water or organic solvents.

Example 6

|  | Parts |
|---|---|
| 2,4,6-triureido 1,3-diazine | 51.2 |
| n-Butyl alcohol | 74.0 |
| Aqueous formaldehyde (approx. 37.1% HCHO) | 64.8 |
| Sodium hydroxide in 5 parts water | 0.1 |

The above components were heated together under reflux at boiling temperature for 15 minutes, yielding a clear, colorless syrup. When a sample of this syrup was heated on a 140° C. hot plate, it bodied to a thermoplastic resin. The addition of chloracetamide, citric acid, glycine, phthalic anhydride and other curing agents such as described under Example 1, either to the syrupy or dehydrated reaction product, yielded a resinous material that was convertible at temperatures of the order of 140° C. to a heat-hardened, infusible state. The solubility and film-forming characteristics of the alcohol-modified ureido-diazine-formaldehyde condensation product of this example make it especially suitable for use in the production of spirit and baking varnishes. For example, it may be used to advantage as a modifier of varnishes of the aminoplast and alkyd-resin types.

Example 7

|  | Parts |
|---|---|
| 2,4,6-triureido 1,3-diazine | 51.2 |
| Acetamide | 11.8 |
| Aqueous formaldehyde (approx. 37.1% HCHO) | 64.8 |
| Sodium hydroxide in 5 parts water | 0.1 | were heated together under reflux for 15 minutes, yielding a clear, very viscous syrup. When a sample of this syrup was heated on a 140° C. hot plate, it bodied to a transparent, thermoplastic resin. Chloracetamide and other curing agents such as mentioned under Example 1, when incorporated either into the syrupy condensation product or into the thermoplastic resin, yielded a thermosetting resin that was converted to an infusible state when heated at 140° C. The heat-convertible resin had an extended flow and curing period. It is especially suitable, therefore, as a modifier of rapidly curing aminoplasts to control the cure rate of such aminoplasts and to improve their plastic flow during curing.

Example 8

|  | Parts |
|---|---|
| 2,4,6-triureido 1,3-diazine | 51.2 |
| Diethyl malonate | 32.0 |
| Aqueous formaldehyde (approx. 37.1% HCHO) | 97.2 |
| Sodium hydroxide in 5 parts water | 0.1 |

All of the above components were heated together under reflux at the boiling temperature of the mass for 15 minutes. During the reflux period a small amount of resin was precipitated from solution. This resin melted and cured to a hardened state in the absence of curing agents upon heating a sample of it at 140° C. Citric acid, glycine and other curing agents such as mentioned under Example 1 accelerated the cure of the resinous reaction product to an insoluble, infusible state. The cured resin had excellent water resistance.

Example 9

| | Parts |
|---|---|
| 2,4,6-triureido 1,3-diazine | 51.2 |
| Glycerine | 12.0 |
| Aqueous formaldehyde (approx. 37.1% HCHO) | 64.8 |
| Sodium hydroxide in 5 parts water | 0.1 | were heated together under reflux at boiling temperature for 15 minutes, yielding a clear, water-white syrup. A thermoplastic resin was produced when a sample of the syrup was heated on a 140° C. hot plate. This resin was converted into a heat-curable resin by incorporating therein various curing agents as described under Example 1. The thermosetting resin had an extended curing cycle and prolonged flow during curing and, therefore, advantageously may be used for improving the plasticity and for controlling the cure characteristics of more rapidly curing aminoplasts. The heat-convertible resin also may be used to advantage in the production of varnish compositions.

Example 10

| | Parts |
|---|---|
| 2,4,6-triureido 1,3-diazine | 51.2 |
| Polyvinyl alcohol | 52.8 |
| Aqueous formaldehyde (approx. 37.1% HCHO) | 129.6 |
| Sodium hydroxide in 5 parts water | 0.1 |
| Water | 200.0 |

The above components were heated together under reflux at the boiling temperature of the mass for 30 minutes, yielding a very viscous, water-white syrup. When a sample of this syrup was heated on a 140° C. hot plate it bodied to a thermoplastic mass. The addition of a small amount of dilute hydrochloric acid caused a rapidly thermosetting resin to be formed. This cured resin had a marked resistance to water. A film of the thermosetting resin was baked on a glass plate by heating the coated plate at 60° to 70° C. A hard, tough, transparent film was formed on the plate. The product of this example is especially suitable for use in the production of varnishes and as modifiers of other synthetic resinous materials. Instead of hydrochloric acid, other curing agents such as mentioned under Example 1 may be employed to accelerate the conversion of the initial reaction product to an insoluble, infusible state.

Instead of the 2,4,6-triureido 1,3-diazine mentioned in Examples 1 to 10, inclusive, we may use any of the other diazine derivatives such as herein described, alone or mixed with each other, for instance a 2-ureido (-NRCONHR) or -thioureido (-NRCSNHR) 4,6-diamino [(-NHR)₂] 1,3-diazine, a 4-ureido or -thioureido 2,6-diamino 1,3-diazine (6-ureido or -thioureido 2,4-diamino 1,3-diazine), a 5-alkyl or -aryl 2-ureido or -thioureido 4,6-diamino 1,3-diazine, etc., more specific examples being 2-ureido (-NHCONH₂) 4,6-diamino 1,3-diazine, 2-thioureido (-NHCSNH₂) 4,6-diamino 1,3-diazine, etc.

In producing these new condensation products the choice of the aldehyde is dependent largely upon economic considerations and upon the particular properties desired in the finished products. We prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives, of urea, thiourea, selenourea and iminourea, substituted ureas, thioureas, selenoureas and iminoureas (numerous examples of which are given in D'Alelio copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in D'Alelio copending application Serial No. 377,524. Particularly good results are obtained with active methylene-containing bodies such as mono- and di-methylol ureas and the methylol melamines, e. g., mono-, di-, tri-, tetra-, penta- and hexa-methylol melamines. Mixtures of aldehydes and aldehyde-addition products may be employed, e. g. mixtures of formaldehyde and methylol compounds such, for instance, as dimethylol urea and trimethylol melamine.

The ratio of the aldehydic reactant to the diazine derivative may be varied over a wide range, but ordinarily the reactants are employed in an amount corresponding to at least one mol of the aldehyde, specifically formaldehyde, for each mol of the diazine derivative. Thus we may use, for example, from one to five or six mols of an aldehyde for each mol of diazine derivative. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example, up to 10 or 12 mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, benzamide, acryloamide, toluene sulfonamides, benzene disulfonamides, benzene trisulfonamides, adipic diamide, phthalamide, etc.; amines such as ethylene diamine, phenylene diamine, etc.; phenol and substituted phenols, including aminophenols, etc.; ketones, including halogenated ketones, e. g., chloracetone, etc.; nitriles, including halogenated nitriles, e. g., acrylonitrile, methacrylonitrile, succinonitrile, chloroacetonitriles, etc.; and others.

The modifying bodies also may take the form of high molecular weight bodies with or without resinous characteristics, for example, hydrolyzed wood products, formalized cellulose derivatives, lignin, protein-aldehyde condensation products, resinous reaction products of aldehydes, for example formaldehyde, with the aminotriazoles (e.

g., guanazole, phenyl guanazole, etc.), alone or admixed with, for example, urea, melamine, or urea and melamine, resins obtained by reaction of an aldehyde with the aminotriazines or the aminodiazoles, alone or admixed with, for instance, urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a ureido diazine or a thioureido diazine of the kind herein described and an aldehyde, e. g., formaldehyde, we may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, boric, acetic, chloacetic, propionic, butyric, valeric, acrylic, polyacrylic, methacrylic, polymethacrylic, oxalic, malonic, succinic, adipic, malic, maleic, fumaric, benzoic, salicylic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, cellulose in flock form, etc.) may be compounded with the resin in accordance with conventional practice to provide various thermoplastic and thermosetting molding compositions.

The thermosetting molding compositions of this invention are usually molded at temperatures of the order of 100° to 200° C. and at pressures of the order of 1,000 to 5,000 pounds or more per square inch.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen or other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a diazine derivative corresponding to the general formula

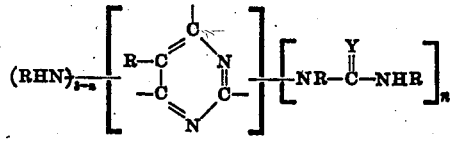

where $n$ is an integer and is at least 1 and not more than 3, R is a member of the class consisting of hydrogen and monovalent hydrocarbon and halo-hydrocarbon radicals, and Y is a member of the class consisting of oxygen and sulfur.

2. A composition as in claim 1 wherein the aldehyde is formaldehyde.

3. A composition as in claim 1 wherein the reaction product is an alkaline-catalyzed reaction product of the stated components.

4. A composition as in claim 1 wherein the reaction product is an alcohol-modified reaction product of the stated components.

5. A composition comprising a condensation product of ingredients comprising an aldehyde and a diazine derivative corresponding to the general formula

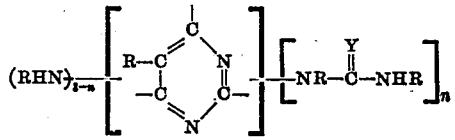

where $n$ is an integer and is at least 1 and not more than 3, Y is a member of the class consisting of oxygen and sulfur, and R represents hydrogen.

6. A heat-curable resinous composition comprising the heat-convertible reaction product of ingredients comprising formaldehyde and a diazine derivative corresponding to the general formula

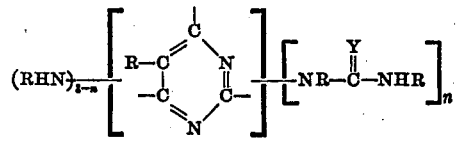

where $n$ is an integer and is at least 1 and not more than 3, R represents hydrogen and Y represents oxygen.

7. A product comprising the heat-cured resinous composition of claim 6.

8. A resinous composition comprising the product of reaction of ingredients comprising 2,4,6-triureido 1,3-diazine and formaldehyde.

9. A resinous composition comprising the product of reaction of ingredients comprising 2-ureido 4,6-diamino 1,3-diazine and formaldehyde.

10. A resinous composition comprising the product of reaction of ingredients comprising 2-thioureido 4,6-diamino 1,3-diazine and formaldehyde.

11. A composition comprising the product of reaction of ingredients comprising a urea, an aldehyde and a diazine derivative corresponding to the general formula

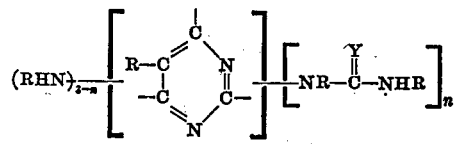

where $n$ is an integer and is at least 1 and not more than 3, R is a member of the class consisting of hydrogen and monovalent hydrocarbon and halo-hydrocarbon radicals, and Y is a member of the class consisting of oxygen and sulfur.

12. A heat-curable resinous composition comprising the heat-convertible reaction product of (1) a partial condensation product of ingredients comprising formaldehyde and a diazine derivative corresponding to the general formula

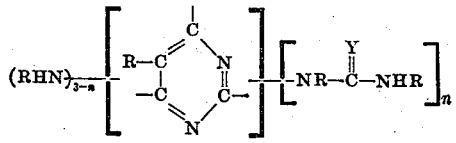

where $n$ is an integer and is at least 1 and not more than 3, Y is a member of the class consisting of oxygen and sulfur, and R represents hydrogen, and (2) a curing reactant.

13. A resinous composition as in claim 12 wherein the curing reactant is a chlorinated cetamide.

14. A product comprising the heat-cured composition of claim 12.

15. A resinous composition comprising the product of reaction of (1) a partial condensation product of ingredients comprising urea, 2,4,6-triureido 1,3-diazine and formaldehyde and (2) chloracetamide.

16. A resinous composition comprising the product of reaction of (1) a partial condensation product of ingredients comprising urea, 2-ureido 4,6-diamino 1,3-diazine and formaldehyde and (2) chloracetamide.

17. A resinous product of reaction of ingredients comprising dimethylol urea, 2,4,6-triureido 1,3-diazine and chloracetamide.

18. A composition comprising the resinous product of reaction of ingredients comprising dimethylol urea, 2-ureido 4,6-diamino 1,3-diazine and chloracetamide.

19. The method of preparing new condensation products which comprises effecting reaction between ingredients comprising an aldehyde and a diazine derivative corresponding to the general formula

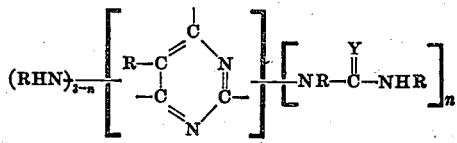

where $n$ is an integer and is at least 1 and not more than 3, R is a member of the class consisting of hydrogen and monovalent hydrocarbon and halo-hydrocarbon radicals, and Y is a member of the class consisting of oxygen and sulfur.

GAETANO F. D'ALELIO.
JAMES W. UNDERWOOD.